United States Patent
Thaler

[19]

[11] Patent Number: 6,018,727
[45] Date of Patent: Jan. 25, 2000

[54] DEVICE FOR THE AUTONOMOUS GENERATION OF USEFUL INFORMATION

[76] Inventor: Stephen L. Thaler, 12906 Autumn View Dr., St. Louis, Mo. 63146

[21] Appl. No.: 08/910,290

[22] Filed: Aug. 13, 1997

Related U.S. Application Data

[62] Division of application No. 08/323,238, Oct. 13, 1994, Pat. No. 5,659,666.

[51] Int. Cl.[7] ..................................................... G06F 15/18
[52] U.S. Cl. .................................. 706/16; 706/28; 706/30
[58] Field of Search .................................. 706/16, 28, 30, 706/31

[56] References Cited

U.S. PATENT DOCUMENTS

| | | | |
|---|---|---|---|
| 5,067,095 | 11/1991 | Peterson et al. | 706/33 |
| 5,150,450 | 9/1992 | Swenson et al. | 706/25 |
| 5,153,923 | 10/1992 | Matsuba et al. | 382/158 |
| 5,155,801 | 10/1992 | Lincoln | 706/20 |
| 5,197,114 | 3/1993 | Skeirik | 706/23 |
| 5,214,715 | 5/1993 | Carpenter et al. | 382/157 |
| 5,226,092 | 7/1993 | Chen | 382/157 |
| 5,239,593 | 8/1993 | Wittner et al. | 382/158 |
| 5,239,594 | 8/1993 | Yoda | 382/158 |
| 5,241,620 | 8/1993 | Ruggiero | 706/16 |
| 5,299,285 | 3/1994 | Tawel | 706/25 |
| 5,303,328 | 4/1994 | Masui et al. | 706/25 |
| 5,303,329 | 4/1994 | Mead et al. | 706/33 |
| 5,303,330 | 4/1994 | Gersho et al. | 706/16 |
| 5,353,207 | 10/1994 | Keeler et al. | 706/23 |
| 5,398,300 | 3/1995 | Levey | 706/16 |
| 5,465,308 | 11/1995 | Hutcheson et al. | 382/159 |
| 5,481,481 | 1/1996 | Frey et al. | 364/528.11 |
| 5,581,459 | 12/1996 | Enbutsu et al. | 706/16 |
| 5,622,171 | 4/1997 | Asada et al. | 706/20 |
| 5,640,494 | 6/1997 | Jabri et al. | 706/25 |

FOREIGN PATENT DOCUMENTS 9217855  10/1992  WIPO .

OTHER PUBLICATIONS

Eapen, "neural network for underwater target detection"; IEEE Conference on Neural Networks for Ocean Engineering, pp. 91–98 Aug. 1991.

Malkoff et al, "A neural network . . . time–frequency distributions"; ICASSP 90, pp. 2739–2742 vol. 5 Apr. 1990.

Dranger et al. "Adaptive classifiers . . . with feedback"; 1993 IEEE International Symposium on Circuits and Systems, pp. 2156–2159 vol. May 4, 1993.

Ekong et al. "Fault Tolerant Neutral Networks for Control Systems", IEEE Conference on Communications, Computers and Power in the Modern Environment pp. 269–275 May 1993.

Saga et al. "Self–Supervised Learning Model"; Fujitsu Scientific and Technical Journal pp. 209–216 Sep. 1993.

*Primary Examiner*—Robert W. Downs
*Attorney, Agent, or Firm*—Haverstock, Garrett & Roberts

[57] ABSTRACT

A device for generating useful information employing a first neural network trained to produce input-output maps within a predetermined initial knowledge domain, an apparatus for subjecting the neural network to perturbations which may produce changes in the predetermined knowledge domain, the neural network having an optional output for feeding the outputs of the first neural network to a second neural network that evaluates the outputs based on training within the second neural network. The device may also include a reciprocal feed back connection from the output of the second neural network to the first neural network to further influence and change what takes place in the aforesaid neural network.

23 Claims, 14 Drawing Sheets

|         | F1  | D1 | F2  | D2 | F3  | D3 | F4  | D4 | F5  | D5 | F6  | D6 | F7  | D7 | F8  | D8 |
|---------|-----|----|-----|----|-----|----|-----|----|-----|----|-----|----|-----|----|-----|----|
| SONG 1  | 532 | 4  | 364 | 10 | 206 | 5  | 370 | 6  | 370 | 11 | 593 | 7  | 593 | 2  | 347 | 7  |
| SONG 2  | 427 | 4  | 207 | 10 | 207 | 4  | 530 | 8  | 530 | 3  | 530 | 5  | 684 | 10 | 684 | 7  |
| SONG 3  | 632 | 2  | 416 | 12 | 241 | 8  | 649 | 7  | 628 | 3  | 481 | 8  | 407 | 6  | 572 | 7  |
| SONG 4  | 697 | 5  | 470 | 4  | 567 | 2  | 503 | 5  | 373 | 3  | 373 | 6  | 543 | 6  | 208 | 6  |
| SONG 5  | 693 | 5  | 226 | 4  | 420 | 4  | 318 | 4  | 313 | 5  | 633 | 10 | 503 | 5  | 503 | 8  |
| SONG 6  | 608 | 2  | 353 | 10 | 214 | 4  | 241 | 7  | 444 | 5  | 201 | 8  | 563 | 10 | 244 | 2  |
| SONG 7  | 314 | 3  | 444 | 12 | 444 | 9  | 659 | 3  | 227 | 10 | 584 | 6  | 659 | 3  | 213 | 11 |
| SONG 8  | 684 | 4  | 684 | 11 | 282 | 4  | 266 | 7  | 400 | 3  | 400 | 6  | 543 | 8  | 530 | 10 |
| SONG 9  | 512 | 2  | 673 | 2  | 217 | 6  | 291 | 4  | 623 | 8  | 423 | 6  | 630 | 5  | 630 | 5  |
| SONG 10 | 623 | 2  | 349 | 5  | 351 | 2  | 351 | 3  | 564 | 5  | 646 | 9  | 416 | 5  | 595 | 10 |

F=FREQ
D=DURATION

OCTAVE

| NOTE | FREQ |
|------|------|
| C    | 523  |
| D    | 587  |
| E    | 659  |
| F    | 698  |
| G    | 784  |
| A    | 880  |
| B    | 988  |

D=18.2 <=> 1 SECOND

Fig. 12

SONG F1,D 1,F2,D2,F3,D3,F4,D4,F5,D5,F6,D6,F7,D7,F8,D8,F9,D9,F10,D 10

| | |
|---|---|
| 1 | 1024, 0, 1599, 1, 1227, 0, 750, 11, 0, 2, 750, 1, 920, 0, 1023, 3, 849, 0, 0, 11 |
| 2 | 804, 3, 843, 750, 2, 728, 2, 750, 4, 587, 4, 659, 3, 784, 2, 696, 2, 329, 2 |
| 3 | 1153, 0, 1599, 3, 1318, 0, 1008, 11, 0, 2, 1174, 0, 1123, 0, 1174, 5, 817, 2, 0, 11 |
| 4 | 466, 1, 212, 5, 561, 0, 784, 1714, 1988, 0, 1108, 4, 494, 4, 0, 0, 0, 0 |
| 5 | 293, 0, 213, 6, 1397, 0, 1591, 11, 1591, 0, 1597, 0, 1595, 0, 1595, 2, 1599, 1, 1600, 7 |
| 6 | 0, 11, 988, 10, 0, 6, 440, 2, 750, 0, 1046, 1, 1246, 10, 1318, 11, 912, 11, 0, 9 |
| 7 | 1046, 0, 1599, 3, 1500, 0, 1085, 11, 0, 2, 1280, 1, 1197, 0, 1270, 5, 1020, 5, 0, 11 |
| 8 | 440, 0, 440, 1, 470, 8, 261, 0, 618, 4, 587, 0, 261, 9, 0, 0, 0, 0, 0, 0 |
| 9 | 0, 0, 0, 3, 923, 0, 1594, 11, 1593, 0, 1593, 1, 1568, 0, 1568, 3, 1568, 0, 1599, 0 |
| 10 | 219, 4, 784, 2, 784, 0, 903, 1, 1085, 3, 440, 0, 659, 3, 587, 3, 523, 6, 0, 1 |
| 11 | 261, 3, 329, 8, 0, 9, 551, 0, 1017, 3, 962, 0, 392, 8, 0, 1, 0, 4, 0, 0 |
| 12 | 0, 0, 231, 1, 620, 1587, 0, 707, 6, 1113, 0, 523, 11, 0, 0, 0, 0, 0, 0 |
| 13 | 0, 1, 0, 10, 467, 0, 1227, 6, 1468, 0, 1522, 0, 1521, 2, 1150, 9, 842, 0, 1500, 1 |
| 14 | 0, 4, 629, 1, 659, 0, 750, 2, 784, 4, 659, 0, 700, 5, 587, 2, 608, 7, 0, 3 |
| 15 | 523, 1613, 1, 816, 1440, 0, 784, 1, 988, 2, 933, 10, 412, 1, 0, 0, 0, 3 |
| 16 | 988, 6, 0, 9, 880, 1, 1086, 2, 908, 0, 659, 0, 1117, 0, 1465, 6, 1545, 10, 1568, 2 |
| 17 | 293, 4, 559, 1, 607, 1, 552, 1, 750, 2, 811, 1, 750, 8, 494, 2, 329, 4, 0, 3 |
| 18 | 209, 4, 392, 5, 329, 4, 587, 1, 856, 4, 880, 0, 559, 6, 329, 1, 392, 6, 0, 1 |
| 19 | 1089, 0, 1599, 1, 1174, 0, 728, 11, 0, 2, 750, 1, 933, 0, 1046, 3, 818, 0, 0, 11 |
| 20 | 704, 1, 0, 11, 938, 0, 1599, 11, 1599, 1, 1589, 0, 1568, 0, 1568, 11, 1238, 0, 1599, 0 |
| 21 | 0, 1, 0 ,4, 417, 0, 1145, 5, 959, 1, 988, 0, 1318, 4, 784, 6, 494, 0, 925, 1 |
| 22 | 826, 7, 494, 4, 0, 0, 615, 1, 564, 6, 261, 3, 612, 0, 988, 4, 784, 5, 1568, 6 |
| 23 | 494, 1, 523, 2, 523, 6, 587, 2, 692, 4, 816, 2, 494, 6, 352, 0, 392, 1, 0, 1 |
| 24 | 261, 0, 461, 0, 392, 6, 211, 0, 566, 2, 880, 0, 329, 11, 0, 0, 0, 0, 0, 1 |
| 25 | 1174, 1, 1598, 7, 440, 0, 843, 11, 0, 1, 880, 2, 1318, 0, 1457, 9, 1149, 2, 0, 11 |
| 26 | 1046, 0, 0, 8, 1046, 3, 1596, 11, 1590, 1, 1384, 1, 937, 0, 1568, 3, 1568, 0, 1599, 0 |
| 27 | 0, 1, 261, 3, 494, 3, 523, 0, 784, 3, 712, 0, 523, 10, 0, 0, 0, 0, 0, 1 |
| 28 | 214, 1, 473, 1, 830, 0, 708, 2, 850, 1, 880, 2, 1119, 9, 659, 3, 293, 1, 880, 5 |
| 29 | 0, 2, 293, 9, 0, 10, 554, 0, 988, 4, 955, 0, 329, 8, 0, 0, 0, 4, 0, 0 |
| 30 | 261, 1, 0, 8, 392, 0, 553, 3, 1069, 1, 620, 0, 1240, 3, 392, 6, 0, 0, 0, 0 |
| 31 | 293, 3, 0, 10, 687, 0, 1500, 10, 1469, 0, 1318, 0, 1543, 1, 1400, 11, 1046, 5, 1568, 3 |
| 32 | 0, 2, 392, 4, 523, 6, 465, 0, 880, 3, 1112, 0, 440, 9, 0, 0, 0, 3, 0, 0 |
| 33 | 880, 5, 880, 5, 392, 1, 784, 2, 841, 3, 628, 3, 928, 1, 1130, 5, 925, 3, 1266, 5 |
| 34 | 0, 0, 0, 9, 750, 0, 1426, 7, 1568, 0, 1500, 0, 1542, 2, 1447, 10, 1318, 0, 1599 ,7 |
| 35 | 880, 3, 566, 8, 932, 2, 1461, 7, 1362, 1, 1318, 0, 1238, 1, 1145, 9, 914, 10, 1414, 1 |
| 36 | 0, 0, 0, 0, 1227, 0, 1568, 11, 1568, 0, 1500, 5, 1101, 0, 1500, 1, 934, 0, 1598, 0 |
| 37 | 0, 0, 329, 10, 1386, 0, 1595, 11, 1596, 0, 1599, 0, 1598, 0, 1596, 8, 1599, 4, 1600, 11 |
| 38 | 0, 9, 329, 1, 691, 0, 819, 5, 848, 2 , 901, 2, 1129, 6, 784, 4, 563, 9, 1318, 4 |
| 39 | 985, 0, 1599, 1, 1174, 0, 750, 11, 0, 9, 750, 1, 914, 0, 1022, 3, 880, 0, 0, 11 |
| 40 | 0, 3, 399, 7, 988, 0, 1174, 6, 1565, 0, 1500, 0, 1568, 1, 1470, 8, 1454, 0, 1599, 9 |
| 41 | 399, 0, 213, 7, 587, 0, 632, 0, 1067, 0, 1201, 0, 138, 6, 494, 9, 910, 0, 0, 0 |
| 42 | 293, 0, 261, 1, 440, 3, 293, 0, 712, 3, 880, 0, 494,11, 0, 0, 0, 0, 0, 0 |
| 43 | 261, 0, 440, 1, 587, 7, 329, 0, 686, 7, 814, 0, 329, 11, 0, 0, 0, 0, 0, 0 |
| 44 | 0, 1, 440, 1, 544, 3, 494, 1, 750, 4, 784, 1, 587, 9, 261, 0, 0, 1, 0, 1 |
| 45 | 1018, 7, 850, 7, 440, 0, 928, 1, 1046, 3, 679, 1, 1091, 0, 1318, 6, 1116, 3, 1568, 7 |
| 46 | 0, 0, 1015, 7, 1294, 0, 1592, 11, 1593, 0, 1598, 0, 1597, 0, 1597, 3, 1599, 4, 1600, 10 |
| 47 | 261, 0, 0, 9, 587, 0, 1500, 11, 1404, 0, 1381, 0, 1500, 0, 1500, 9, 1568, 5, 1598, 0 |
| 48 | 353, 0, 210, 8, 1010, 0, 696, 2, 1262, 0, 1435, 0, 1500, 0, 1221, 4, 1174, 0, 750, 1 |
| 49 | 0, 0, 0, 0, 1250, 0, 1596, 11, 1568, 0, 1568, 3, 1262, 0, 1500, 2, 750, 0, 1599, 0 |
| 50 | 329, 0, 329, 1, 211, 9, 392, 0, 717, 4, 838, 0, 261, 10, 0, 0, 0, 0, 0, 0 |

Fig. 15

Greater than 35 mpg, less than $ 25,000, user satisfaction of + 1

| | |
|---|---|
| SPEC. | |
| DOORS | 2 |
| BODY | COUPE |
| DRIVETRAIN | FWD |
| WHEELBASE (IN.) | 100.16 |
| LENGTH | 175.21 |
| WIDTH | 65.02 |
| FUEL CAP. (GAL.) | 13.3 |
| ENG. DISPL. | 1.7 |
| CYLS | 4 |
| HP (AT 5930 RPM) | 107 |
| TORQUE (4598 RPM) | 112 |
| TRANS | MAN. |
| SPEEDS | 5 |
| BRAKES | FRONT DISC – REAR DRUM |
| TIRES | 165 / 75 / 12 |

HWY MILEAGE = 38.6 MPG
ANTICIPATED USER SATISFACTION = 1
PRICE = $ 16,117

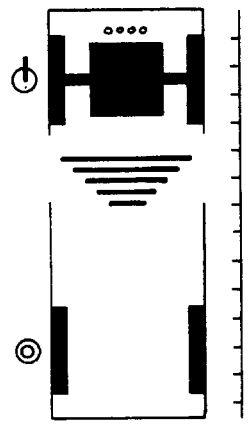

Fig. 17A

Less than 8 sec in 0-60 accel top speed not less than 150 mph

| | |
|---|---|
| SPEC | |
| DOORS | 2 |
| BODY | COUPE |
| DRIVETRAIN | RWD |
| WHEELBASE | 102.16 |
| LENGTH | 187.89 |
| WIDTH | 69.38 |
| FUEL CAP (GAL) | 21.6 |
| ENG DISPL | 4.1 |
| CYLS | 8 |
| HP (6085 RPM) | 241 |
| TORQUE (3586 RPM) | 269 |
| TRANS | MAN. |
| SPEEDS | 5 |
| BRAKES | ALL DISC |
| TIRES | 225 / 45 / 15 |

HWY MILEAGE = 20.3 MPG
ANTICIPATED USER SATISFACTION = 0
PRICE = $ 93,892

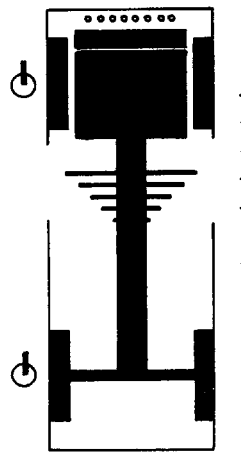

Fig. 17B

DEVICE FOR THE AUTONOMOUS GENERATION OF USEFUL INFORMATION

This application is a division of application Ser. No. 08/323,238, filed Oct. 13, 1994, U.S. Pat. No. 5,659,666.

The present invention relates to a process for simulating the internal imagery and additional mechanisms which together emulate creativity in the human mind. The device allows for the totally autonomous generation of new concepts, designs, music, processes, discovery, and problem solving using recent developments in the area of artificial neural network (ANN) technology. Several examples of the type of useful information that can be obtained using the present technology are set forth and described herein. The present device can be used to tailor machine responses thereby making computers less rigid in communicating with and interpreting the way a human responds to various stimuli. In a more generalized sense, the subject device or machine supplies the equivalence of free-will and a continuous stream of consciousness through which the device may formulate novel concepts or plans of action or other useful information.

Prior to this invention, artificial neural network (ANN) emulations of biological systems were used for non-creative tasks such as pattern recognition, neural control, and the generalization of experimental data. The present device represents a new approach and a new application of ANN's in which the system synthesizes novel plans of action and original designs or creations. These systems, which we refer to as autonomous systems or "creativity machines" may perform imaginative feats that extend beyond technological invention into the realms of aesthetics and emotions.

The present device employs two essential components, namely, (1) a progressively perturbed neural network containing training in some problem domain and, as a result of the perturbations, continuously outputs a stream of concepts, and (2) a second or patrolling neural network which constantly monitors the outputs of the first network to identify and isolate useful outputs. This tandem arrangement may be thought of as constituting a model of creativity, and perhaps attentional consciousness, and this internal imagery is spontaneously generated within the perturbed network, while the second patrolling network is constantly alert to specific images possessing either utility or other useful characteristics including aesthetic appeal. The perturbations used may be achieved by any number of different means including by the introduction of noise, relaxation or degradation of the network and so forth. The two components discussed above will be described in more detail hereinafter.

It is important to emphasize that the present systems need not accept external information. Instead, information emerges spontaneously as a result of any number of stochastic and/or systematic processes applied to the characterizing parameters of the networks involved. With this tandem arrangement of the free-running neural network and its policing counterpart, it is possible to generate a notion that is superior in quality to anything generated by a known device or machine similarly exposed or perturbed.

DISCUSSION OF THE PRIOR ART

The inventor has demonstrated that the application of certain types of noise to the inputs or weights of an ANN may produce novel outputs if the vector completion process fails to activate an output vector encountered during the network's training. Such outputs generally take the form of a combination of known training outputs and generally emulate the environment in which it was trained. Therefore, a neural network trained to generate the surface profiles of some device or object such as a known mountain range would tend to produce very plausible but unfamiliar mountain ranges if the inputs are subjected to random stimulations. Similarly, a neural network trained to only produce classical music would tend to produce potential classical themes when exposed to random inputs. The inventor has shown that static networks have produced some very novel outputs which have been detected within mathematical studies. In all known cases, however, they have been isolated by a human operator for their novelty. In contrast, the present device autonomously monitors the output of such a network and selects emergent concepts on the basis of some predetermined criteria established within the policing or patrolling neural network. Such concepts may include producing music or musical themes for some purpose, or for designing some device such as a coffee mug, or producing a process planning operation, or solving a problem, and for many other applications some of which will be described more in detail hereinafter.

Known ANNs have obtained a relatively high degree of precision in some areas such as in input-output mapping. The present invention teaches the use of deliberate degradation of an ANN and therefore a corruption of such precise mapping to produce useful information. Thus a network trained to duplicate some knowledge domain may generate fairly representative examples of known devices at low levels of network degradation. For example, in the case of automobile design the known networks may generate fairly representative examples of existing cars at low levels of network degradation owing to the constraints existing within the network. In other words sensible designs are produced. At progressively higher levels of network degradation, such network constraints further relax to produce novel and more unusual hybrid automobile designs, some of which may fill a useful application niche or market. The key to making the transition from the ordinary to the novel is achieved by the control over the network degradation and the ability to relax or perturb certain network parameters from their trained-in values. Thus the present device provides a way to design around the ordinary or the near ordinary and to create new designs in much the same manner as a creative designer would do, unlimited by certain constraints. As a result of the introduction of various forms of perturbations to the inputs, internal activations, weights and biases such known systems may control a process or create an object or design. The information thus produced with the present device may be stored for later use to control a process or the like and/or used in its own autonomous decisions to modify the output or outputs that have been produced in some desired fashion. Thus the present system provides another tool, and a very broad based tool, for doing design or creative work using a machine that includes the two elements discussed above. It is contemplated, however, to fine-tune or toggle the subject device to autonomously change its mode of operation from performing one task to performing a different task or different purpose.

Being able to internally modify the network in a myriad of ways allows for vast numerical superiority in the number of viable concepts that may be produced, The present tandem arrangement of networks allows for complete autonomy in this task.

OBJECTS OF THE INVENTION

It is a principal object of the invention to teach the construction and operation of novel means for simulating creativity.

Another object is to perturb artificial neural networks, previously trained, in order to produce useful and imaginative output information.

Another object is to monitor output information from a perturbed neural network in order to select desired outputs and reject others.

Another object is to produce controllable changes in a neural network by controlling the extent of perturbations applied thereto.

These and other objects and advantages of the present invention will become apparent after considering the following detailed specification of preferred embodiments in conjunction with the accompanying drawings wherein:

BRIEF DESCRIPTION OF THE DRAWINGS

FIG. 12 shows ten (10) musical phrases produced by the device shown in FIG. 9;

FIG. 15 shows fifty (50) novel musical themes or phrases produced by the device of FIG. 13;

FIGS. 17A and 17B show two automobile designs produced by the subject device including a design (1) to achieve at least 30 PMG, cost less than $25,000.00 and have a favorable rating in terms of user satisfaction and design (2) which is an automobile capable of accelerating to 60 MPH in less than eight (8) seconds and achieve a top speed of at least 150 MPH.

DETAILED SPECIFICATION OF PREFERRED EMBODIMENTS

Figure 1:
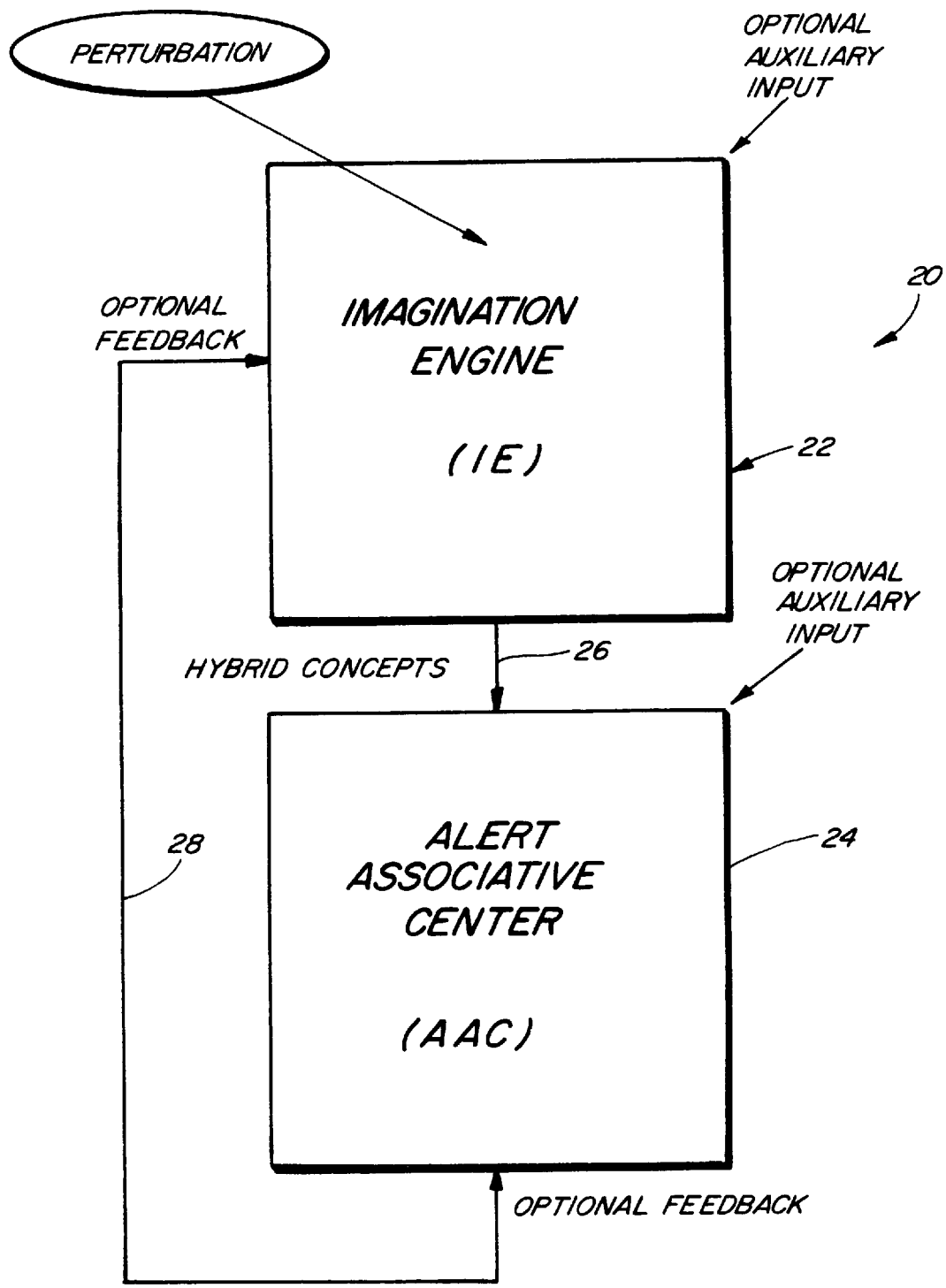
FIG. 1 is a block diagram of a device entitled imagination engine (IE) in association with an alert associative center (AAC) connected to operate according to the teachings of the present invention.

Referring to the drawings more particularly by reference numbers, number 20 in FIG. 1 refers to a system constructed according to the present invention. The system 20 includes two basic components, one labeled imagination engine (IE) 22 which is an artificial neural network (ANN) that is progressively perturbed while producing outputs which it feeds to an alert associative center (AAC) 24 which is also an artificial neural network which in turn may have one or more feed back connections 28 to the IE 22. The IE or imagination engine constitutes that portion of the subject device that receives the input information in the form usually of stochastic noise or perturbations applied against the training of the IE and is applied to its weights, biases, inputs, outputs or internal activations. The imagination engine is so described in order to convey the idea that this network is perturbed either internally or externally, and as a result of attempting to perform pattern completion in the presence of the perturbations or noise, produces outputs which freely wander through some given knowledge domain which is embodied in the network's training. The outputs can also be recycled. The outputs of the IE are monitored or patrolled by the AAC. The IEs and the AACs may be grouped or coupled into one or more of a plurality of relationships depending upon what is to be accomplished and the nature of the inputs and outputs that are required. The IE and AAC can be combined into more complex systems involving a plurality of coupled ANNs and is able to perform more involved tasks including problems that require a certain degree of creativity.

It has been discovered that it is common to all neural networks that whenever a neural network is subjected to a synaptic perturbation process wherein connection strengths between neurons are progressively altered, such a process activates the memories of the environmental features the network has already seen or been trained in. Thereafter, as the network continues to evolve from its initial trained state, such environmental features are combined into hybridized or juxtaposed features. For example, a neural network trained to produced the images of various animals including those of a cow and a bird would first produce random, intact images of these animals and birds during low levels of synaptic perturbation. Progressively stronger perturbations in synaptic connection strength would now produce hybridized images, including that of a flying cow, something that is part cow, part bird and so forth. In other words, the same universe embodied within the IE has begun to unravel as constraints are gradually removed and new, unheard of combinations emerge. By the same token, intact neural networks, either artificial or biological, may be activated to produce novel environmental images by noise or other processes occurring externally to themselves. Such noise may be generated by the function, relaxation or degradation of other surrounding networks and communicating biological networks or complex network implementations. The results will be similar to that when using internally generated perturbations, with a spontaneous appearance of both straight forward as well as hybridized environmental features.

Figure 3:
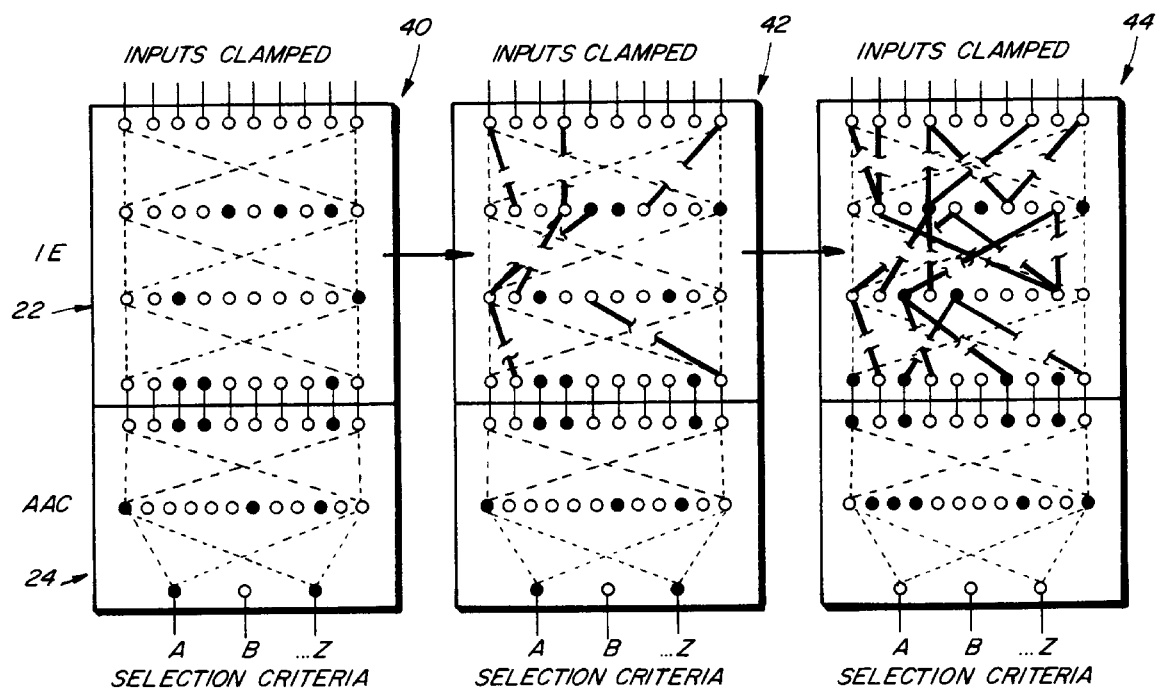
FIG. 3 illustrates how perturbations in the form of connection weight pruning can be applied to the present device to produce a plurality of outputs any one or more of which can be selected to represent the desired output information (mode B)

This can also be accomplished by constructing the IE of a plurality of neurons so that some portion of the processing units remains unrecruited to the required training or mapping. Application of any of the perturbing influences to these uncommitted neurons can produce significantly increased generation of useful concepts, which can in turn be captured or processed or selected by the AAC. The AAC which is the second major component of the subject device is likewise an ANN which has been trained to identify useful information or juxtapositions produced by the IE. The AAC is therefore an opportunistic network on the lookout for certain features or conditions such as for particular animals or the like in our example. In a typical situation, the AAC can be trained to assign numerical or other scores to the hybrids synthesized by the IE. Also, one or more separate algorithms can store potentially useful concepts for later consideration and refinement, or alternatively can be used to immediately influence results in a hardware condition. In some embodiments it is also contemplated that some of the inputs to the AAC may not be connected to outputs of the IE but left free for other purposes. In this way the AAC selection criteria can be adjusted initially or during operation for example as shown in FIG. 3.

Figure 2:
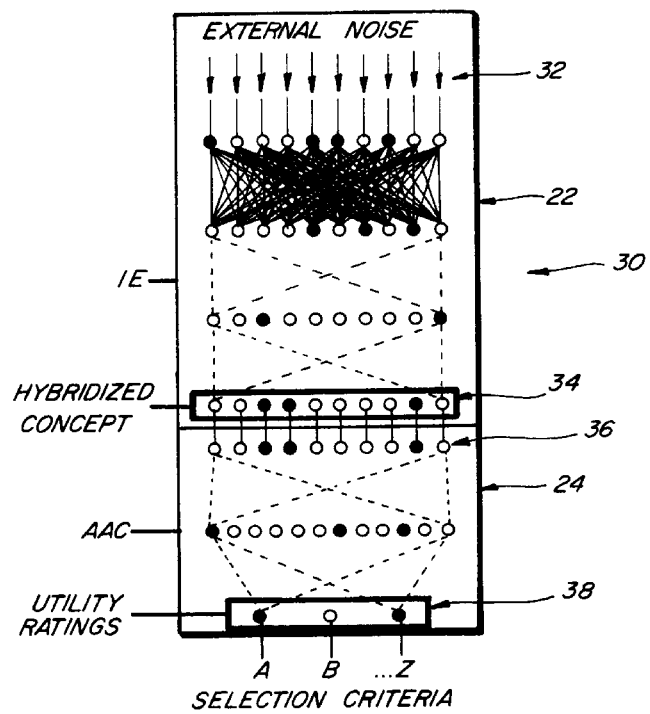
FIG. 2 illustrates how perturbations from an external source are applied to the present device to produce a plurality of outputs any one or more of which can be selected to represent the desired output information (mode A)

Three different modes of operation for the combined IE and AAC will be discussed hereinafter. These modes can be used separately or in various combinations. These are described as modes A, B and C. In mode A, any number of techniques, including random number generation, may be used to supply novel inputs to the IE. This results in the IE attempting vector completion on the novel inputs, usually resulting in some change or juxtaposition of its established training outputs. The AAC then checks the utility of these resulting hybridized outputs from the IE and assigns values to select criteria shown as A–Z in FIG. 2. When the selection criteria are met, the hybridized output may then be immediately utilized or recorded for later use.

In mode B, fixed values are clamped to the inputs of the IE while its weights, biases, or internal activations are perturbed by any number of numerical techniques, including random number generation to perturb them from their original values. An internal completion process within the network layers produces new conditions or juxtapositional concepts which emerge at the outputs of the IE. The AAC then rates these in terms of their usefulness based on its own training. As in mode A, these new concepts may be utilized in real time as the network relaxes or saved in an archival file for later use.

Figure 4:
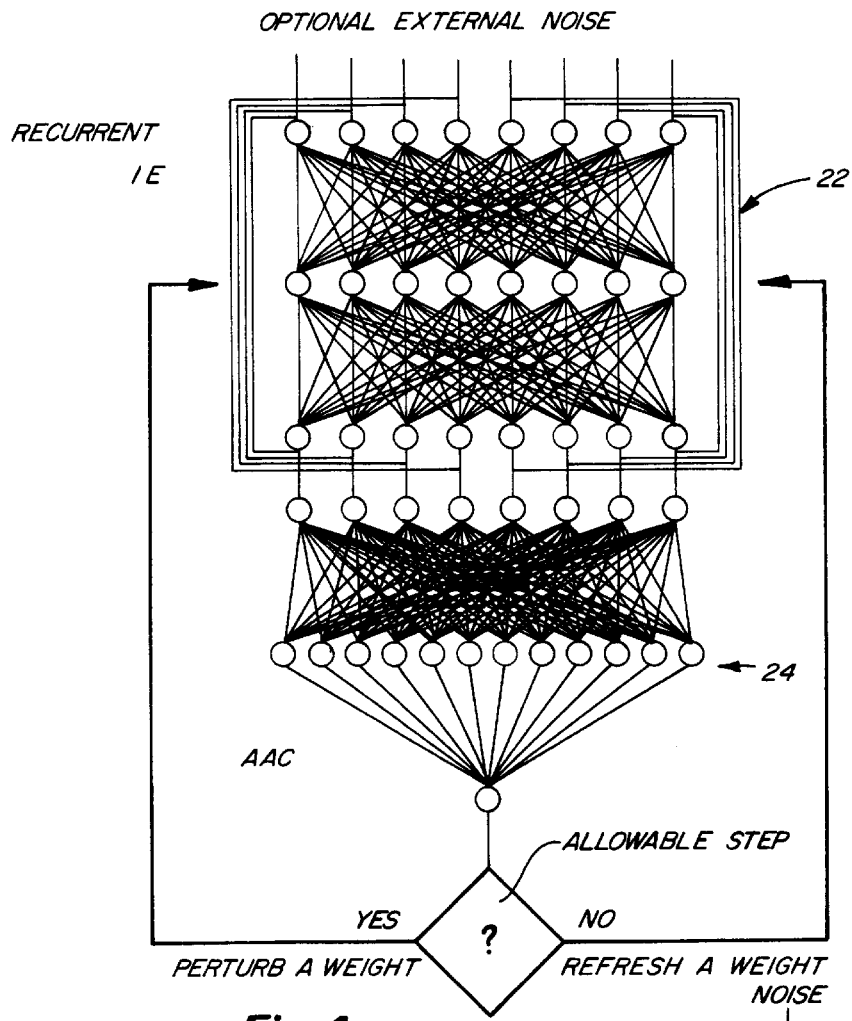
FIG. 4 illustrates how perturbations in the form of connection weight pruning can be applied to a recurrent network to produce a plurality of outputs which can be selected to represent a novel procedure (mode C)

In mode C, the IE perturbation is used to create a plan of action or a procedure to solve a given problem. Such a system is shown in FIG. 4. In this case the IE feeds its own outputs back to its respective inputs and the procedure consists of a sequence of steps, each of which is contingent upon the prior step. In mode C, the AAC examines each step to assure its utility in forming an allowable and useful step in arriving at the desired result. Also in mode C, the AAC may be used to modify the architecture of the IE at any stage, for instance, by the removal, modification, or replacement of any given weight or step. In mode C, the algorithm governing the operation would have weights randomly chosen within the IE and set to constant values, for example zero. The AAC would then evaluate the system configuration for its utility or other purpose. If the evaluated state is not an allowable one, the AAC would make the decision to replace the temporarily removed weight and inform the driving algorithm to select a new weight for removal. Once the desired system configuration is obtained, the system begins to remove more weights from the IE. The AAC is alert to whether the overall target configuration was obtained. If it was, the algorithm stores the successful sequence of operation which constitutes a procedure or it would immediately convey this information to control some external device or hardware mechanism. In this way an ANN serving as the IE assists, in a manner somewhat similar to the way the human brain works, storing a concept or idea using a computer or the like. This can be done in the present device by having a human participant or the machine user produce feed backs to the IE in which different perturbations are applied to the IE network for some purpose such as to boost or change its outputs. By using multiple IEs and AACs more complex outputs can be obtained and in some cases more accurate and precise data can be produced. For example, many separate networks of this type can be used in the concept selection process thereby necessitating the use of many different AACs.

In any of the above modes or juxtapositions any combination of perturbing factors can be used to generate novel concepts within the IE. Such perturbations may combine different factors such as (a) weights, (b) biases, (c) activations, (d) external input signals, (e) internal input signals to any given unit within the network, or (f) internal output signals from any given unit within the network. In like manner the parameters a–f may be perturbed by various means such as by (1) successively setting their values to some constant value such as zero; (2) successively adding some random number as obtained with a random number table to their original values; (3) successively changing their values by replacing them with random numbers obtained from a random number table; (4) multiplying their values by a time-dependent factor usually with some decay constant; (5) successively adding positive and negative random numbers obtained through a random number table to allow these parameters to perform a random walk about the original values; (6) adding numbers which obey certain statistical frequency distributions of the form where the probability of choosing such a number obeys a probability function; (7) adding numbers which obey set time-dependent statistical distributions; and/or (8) progressively multiplying any of the above factors by some gradually increasing amplitude factor so as to smoothly transition the IE from its original constrained condition, implicit within its training, to progressively relax constraints as the weights and biases stray from their training values. It has been found that enhanced results may be obtained by specifically applying such perturbating influences to neurons which have not been fully recruited into the network's mapping or training.

In summary, an autonomous search procedure to arrive at novel concepts has been described, and such a search procedure is applicable to different knowledge domains and are arrived at through the interaction of two separate neural networks. The first IE network is trained to produce outputs within the knowledge domain of its training. The introduction of perturbations to any number of ANN features cause the IE to wander through the knowledge domain producing meaningful outputs under the constraints of its connection strengths and biases. As the level of the network perturbations increases, the constraints begin to more dramatically relax from their trained-in values and unconventional conceptual juxtapositions emerge which can be detected and utilized by the AAC to alert an associative center or output device. The major strength of this technique is its ability to gradually and systematically perturb the IE network from a state in which it simply duplicates known features of its knowledge within its knowledge domain to a subsequent state of perturbation in which ever so slightly new juxtapositional concepts emerge. The subtle changes from the conventional to the mildly unconventional produce new and potentially useful inventions which can be autonomously identified and selected by the AAC. Thus the present device limits its search space in seeking solutions to many different problems and it does so in a unique manner.

COFFEE MUG DESIGN

Figure 5:
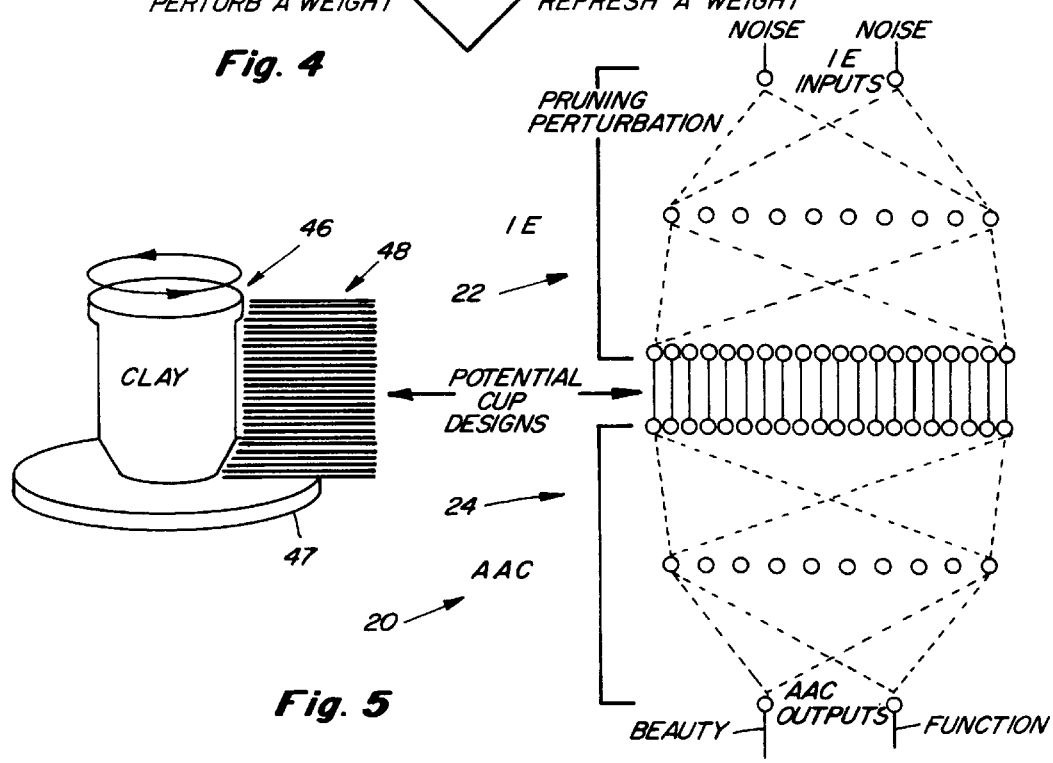
FIG. 5 is a diagram of one embodiment of the subject device used in designing and/or producing a desired shape for a coffee mug.

Referring now to FIGS. 5–8 there is shown an embodiment of the subject device that can be used in the design and production of devices such as a novel coffee mug and the like. The subject coffee mug can be aesthetically pleasing and also serve a useful function. It is apparent, however, that the subject device is not limited to the production of coffee mugs and can be used to produce many other designs and shapes including works of art. It is also possible to interface the subject device with a lathe, stereo lithographic, or other operating device including a potter's wheel to cause the subject device to produce in a three dimensional form, the object in question, in this case a coffee mug. In FIG. 5 the subject device 20 is illustrated on the right hand side and a potter's wheel 47 with a mound of clay 46 mounted on it is shown on the left side. Also shown in FIG. 5, in illustrative form, is a device or operator member 48 which operates against the lump of clay 46 to form the coffee mug into the desired shaped. The controls for the shaping means 48 are produced by the output of the IE 22 as selected by the beauty and function outputs which signal the controlling algorithm to apply the IE outputs.

Figure 6:
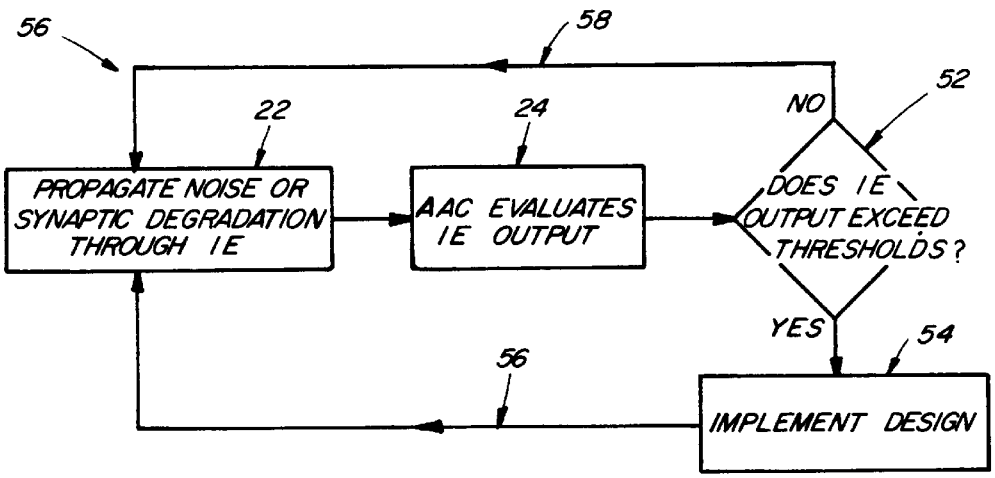
FIG. 6 is a block diagram of the means employed to produce the coffee mug of FIG. 5.

FIG. 6 is a logic flow diagram of the means shown in FIG. 5. The diagram includes the IE 22, the AAC 24, an output decision block 52 which has a NO output flowing back to the IE on 58 and a YES output 54 labeled Implement Design which is led back at 56 to the IE. The block 52 is labeled Does IE Output Exceed Thresholds?. The YES output 54 controls devices such as a template or movable pins or the like in such a manner as to form the shape of the mug.

Figure 7:
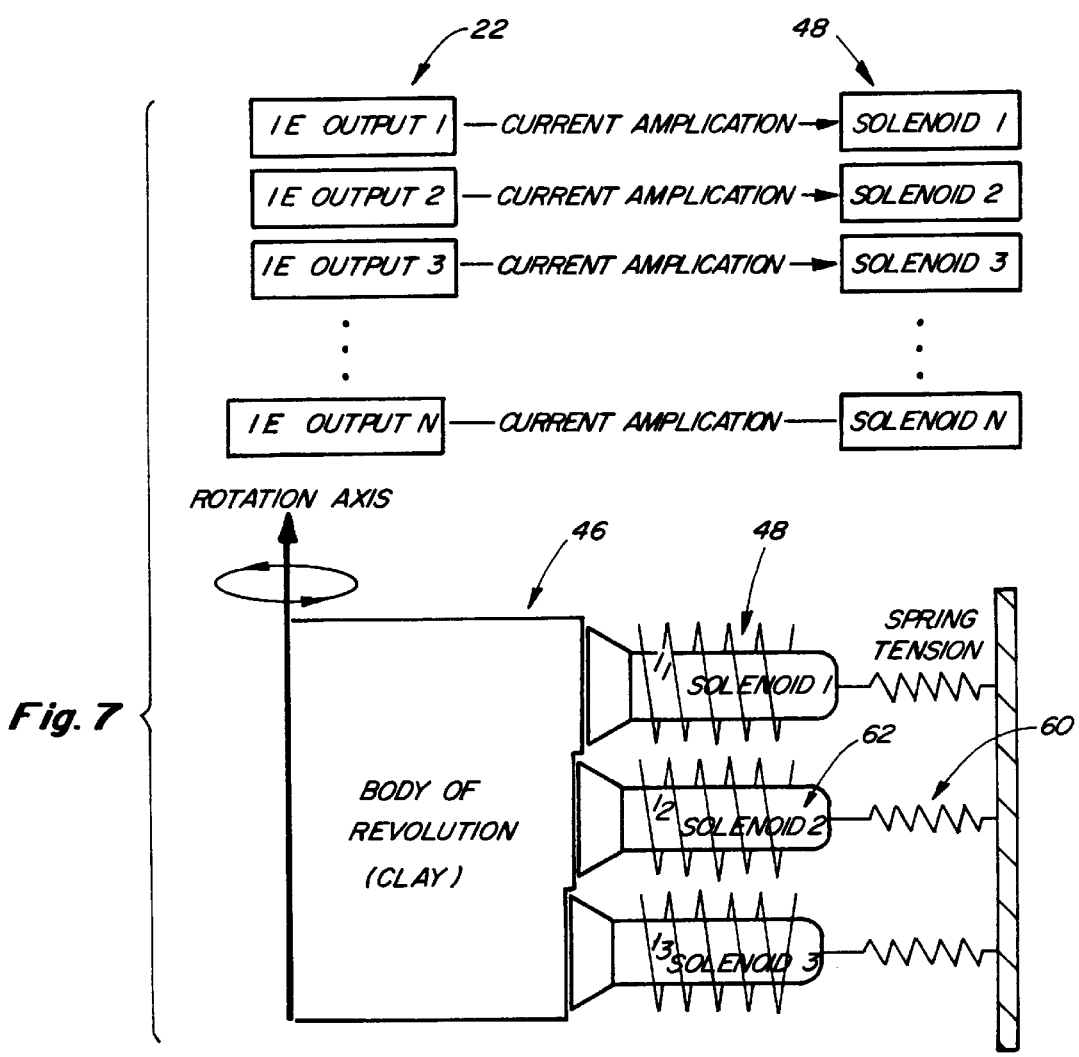
FIG. 7 is a view showing one form of the operating members controlled by the subject device in the production of the desired shape for a coffee mug.

FIG. 7 illustrates how the outputs of the various portions of the IE 22 are used to control, in this case, solenoids 48 which have means that engage the body of clay 46 to produce the desired shape. The solenoids 62 are parts of the assembly 48 and are shown operated by spring tension produced by springs 60 and offset by the magnetic force generated by the electrical currents proportional to the IE outputs.

Figure 8:
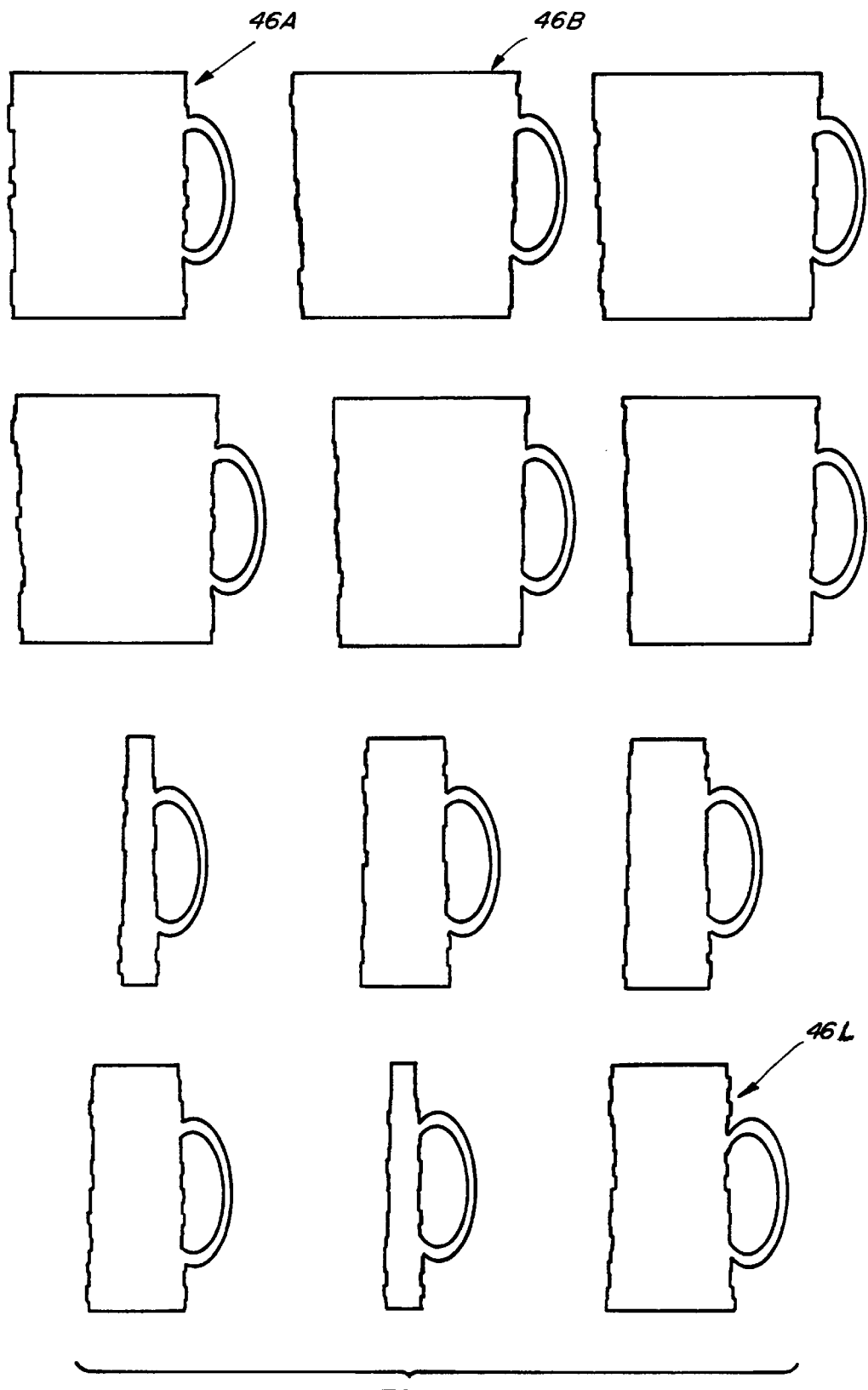
FIG. 8 shows examples of acceptable and unacceptable coffee mug designs.

FIG. 8 shows various coffee mug designs, including some which are aesthetically pleasing and utilitarian, and others which have minimal utility values. The cup designs are labeled 46A–46L.

In designing a coffee mug, various options should be assembled as to the aesthetic and utilitarian preferences and this information should be encoded in the AAC. This can be done using a computer code which generates vertically aligned stripes of various lengths which together stimulate the profile or potential mug design. These designs can be displayed on a cathode ray tube or the like using stripes of random lengths and widths and opinions can be gathered as to beauty and utility using ranking scores. The information thus obtained can be put on a spread sheet to be used for training the two separate neural networks, the IE and the AAC. The IE is trained using beauty and utility as the inputs and the AAC reverses the significance of the inputs and outputs so that the shape now serves as inputs and beauty/utility ratings and these become the outputs.

MUSIC

Figure 9:
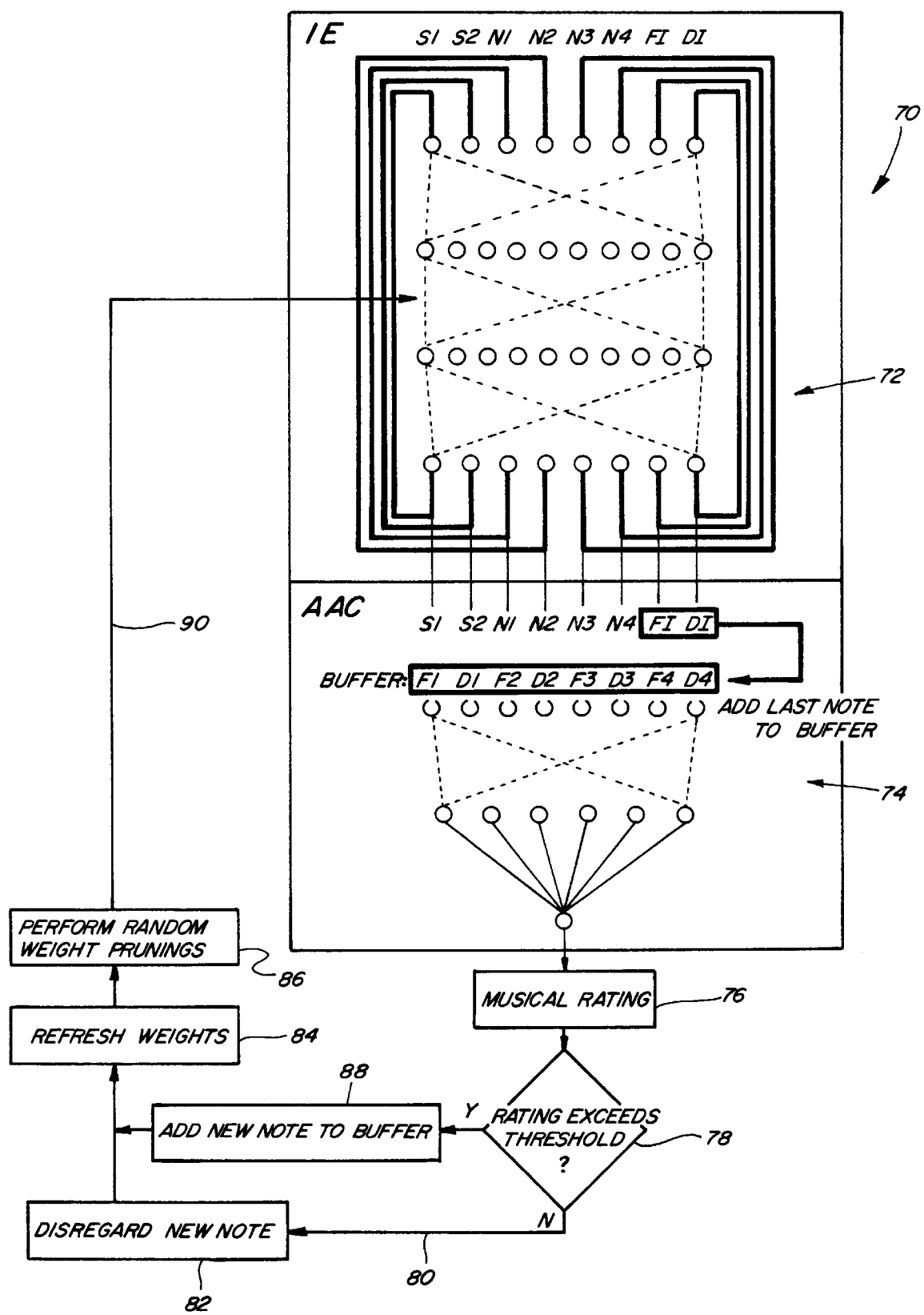
FIG. 9 is an embodiment of the inputs and outputs of the subject device used for producing musical verses utilizing a recurrent network.
Figure 10A:
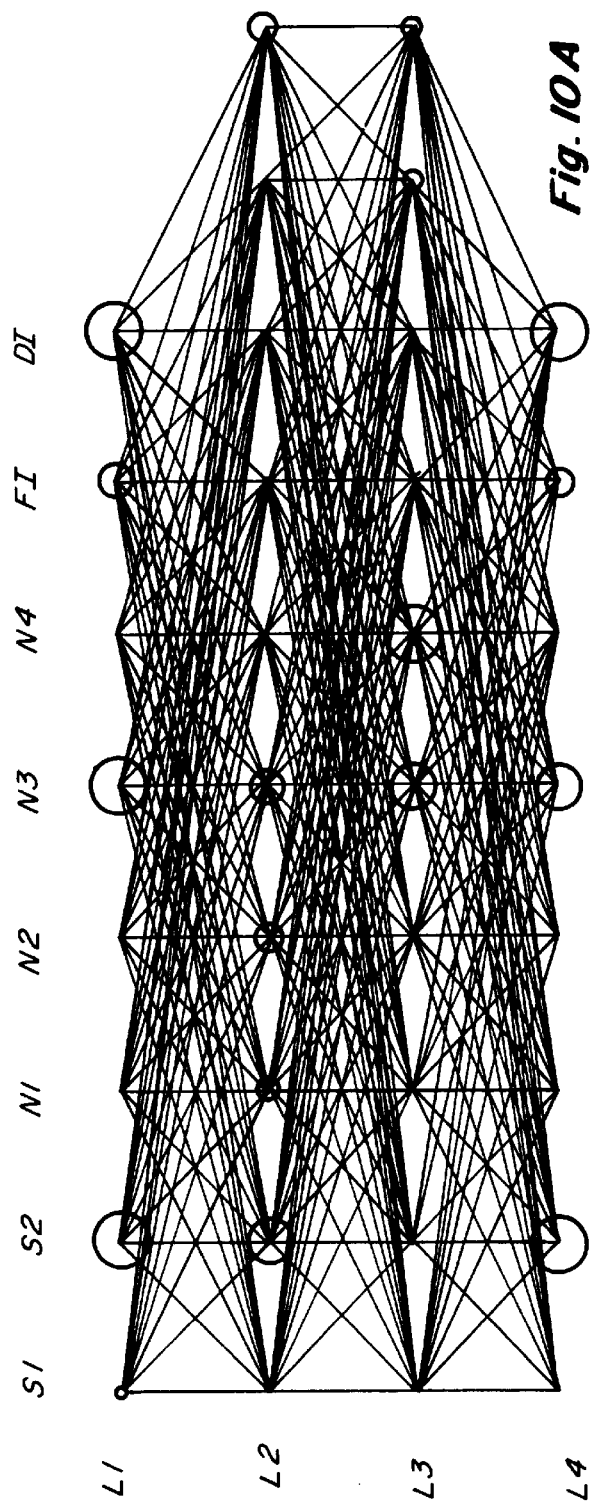
FIGS. 10A, 10B and 10C illustrate network activations employed in the production of acceptable music where the training produces a combination of the songs "TWINKLE, TWINKLE LITTLE STAR", "DAISY" and "MARY HAD A LITTLE LAMB"
Figure 10C:
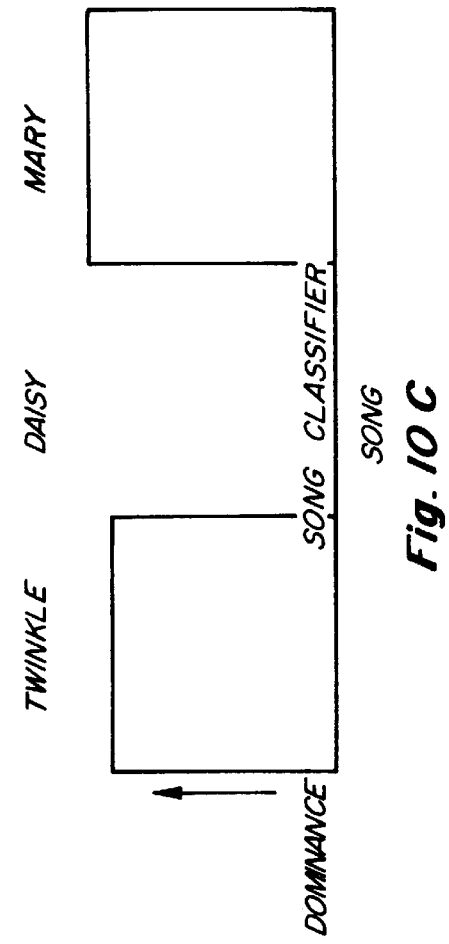
Figure 10B:
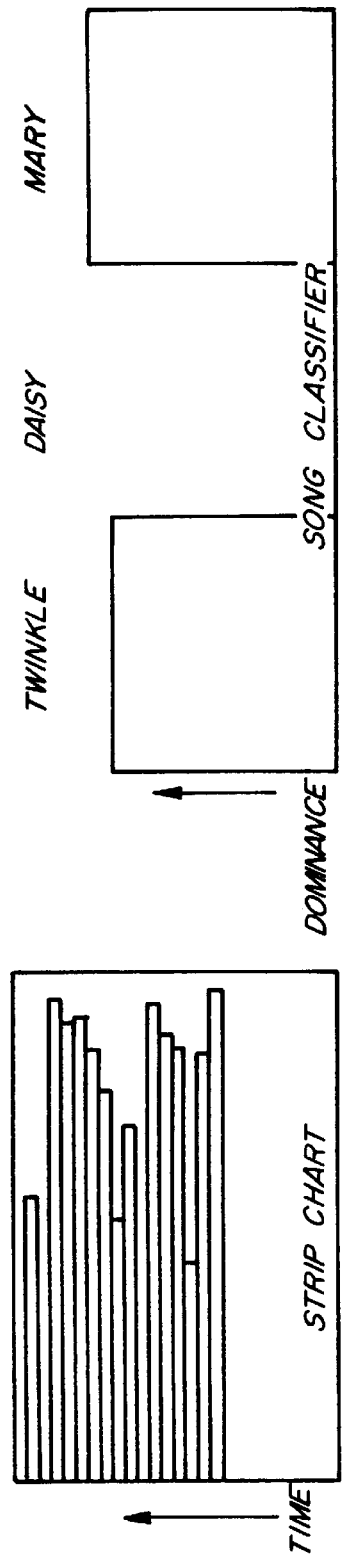
Figure 11:
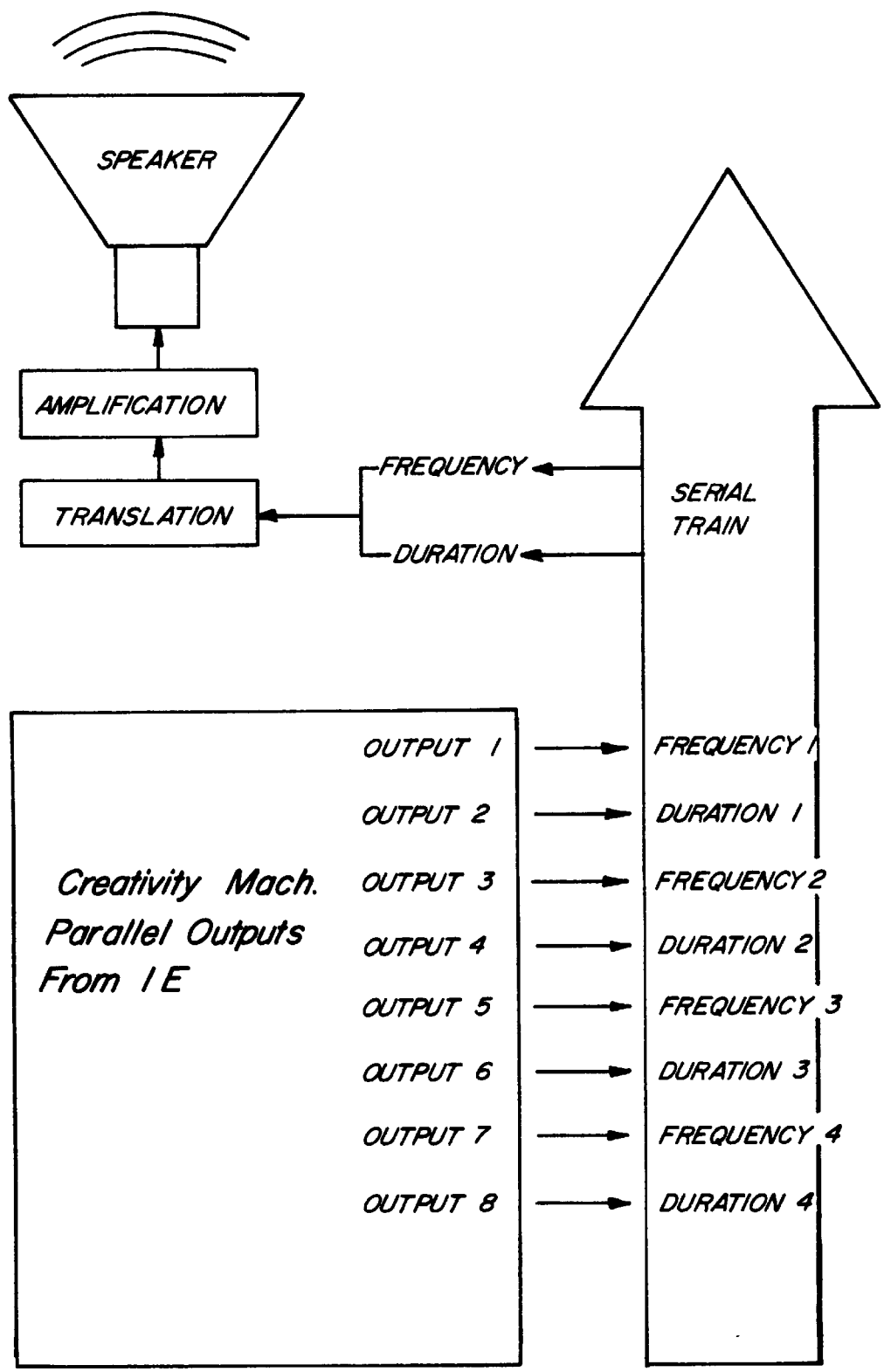
FIG. 11 shows the manner in which the subject device converts the outputs to sounds.

FIGS. 9–15 illustrate the subject device 70 being used to produce musical compositions or musical phrases. Referring to FIG. 9, the device 70 includes an IE 72 and an AAC 74 shown coupled together as in the previous constructions. The AAC is trained to select from among the various outputs of the IE and to produce an output musical rating at block 76, which rating is applied to a block 78 which is labeled Rating Exceeds Threshold?. If the rating does not exceed the threshold then an output will be produced on lead 80 which is applied to a block labeled Disregard New Note 82, and this output is applied to other blocks including block 84 labeled Refresh Weights and block 86 labeled Perform Random Weight Prunings and fed back to the IE on lead 90. If the output of the block 78 is YES then outputs will be produced through the block 88 labeled Add New Note To The Buffer for applying back to the IE to farther modify the condition of the IE. The difference between FIG. 9 and the design previously discussed in connection with the production of a coffee mug is that in FIG. 9 the outputs are musical tones or the like arranged in a particular manner depending upon the training of the IE and the AAC, and the outputs are musical phrases or themes as will be explained. In the production of musical compositions or themes the present device employs a similar relaxation technique that embodies modes A, B and C, as discussed above, and in so doing achieves a meaningful synthesis of the original musical themes. The IE in this embodiment is a recurrent network which learns to perform a number of songs such as "TWINKLE, TWINKLE LITTLE STAR", "DAISY" and "MARY HAD A LITTLE LAMB". The network as shown utilizes an 8-10-8 architecture as shown in FIG. 9, with the outputs of the network fed back as inputs. The first two inputs encode song (S1), (S2), the next four (N1–N4) signify note order and the last two (FI, DI) contain the pitch and duration of any given note. The outputs of the network take on similar significances with all the values taking on appropriate values for the next note within the musical sequence. The network as shown in FIG. 10A has four layers (1–4), denoted (L1–L4). The outputs of the network attain the same significance but now represent the next note in the sequence. There are two hidden layers of neurons each necessary to achieve the desired mapping. This is shown in FIG. 10A by the two middle rows of neurons. By setting the left most inputs S1–S2 to values of (0,1), (1,0) or (1,1), the recurrent network would play "TWINKLE, TWINKLE LITTLE STAR", "DAISY" and "MARY", respectively. The application of random numbers to all of the inputs of the networks and in particular to S1 and S2 would cause the network to jump from one song to another song thereby juxtaposing tunes and producing music.

Referring again to FIGS. 10A–10C there is shown (1) network activation in the form of individual neurons shrinking and expanding according to different levels of activation, (2) a strip chart recording the most recent train of notes including their pitches, and (3) the output of a separate network which has been trained to classify the output of the concurrent network as a linear combination of any of the three training melodies. This latter feature is helpful in envisioning the weighting of individual tunes within the hybridized songs. Such musical hybridization is occurring in FIG. 10C where we see a combination of "TWINKLE" and "MARY" having been selected by the AAC and being performed. Training of the IE is accomplished by creating the map between successive notes within any particular song. As inputs the circuit is provided with binary coded labels for the song number. For example, binary coded song numbers 1–3 are input to nodes S1 and S2, binary coded note order 1–31 are input to nodes N1–N4 and frequency and duration values are input to nodes F1 and D1. The targets for training include identical binary coded song number (output notes S1 and S2), binary coded note order incremented by a value of 1 (output nodes N1–N4) and the next frequency-duration pair of the song in output nodes F1 and D1. Wrap-around of the songs is achieved by mapping the last note in the musical sequence to the first. What has just been described refers to the operation of the IE. It is now necessary to describe the function and training of the AAC which operates on the output from the IE. For training purposes a training computer code is written to generate a series of 4 notes, consisting of a series of notes which obey a 1/f distribution, a feature which is characteristic of all sounds we accept as music. This series of tones is subjected to an evaluation after which human evaluators were asked to respond on a 0–10 point scale to its aesthetic value. After about 100 trials of this sort, the series of frequencies comprising each melody was passed to a spread sheet along with their consensus rankings. Inputs therefore consisted of the note sequences along with target values for training consisting of the numerical scores. Real melodies were implanted within the training set and ranked at values of 10 for their appeal. Noise on the other hand from a random generator was embedded within the spread sheet with ranking values of 0. Following training on this data, the trained neural network IE and AAC were embedded within the same computer code.

The IE was placed within a loop wherein values between zero and 1 were fed to its inputs from a random number generator thus producing or generating composite melodies at the IE's outputs. A buffer containing at most four notes (4 frequency-duration pairs) played at anytime was sampled by the eight inputs of the AAC, rating each according to its musical acceptability. The best musical themes, those exceeding a threshold of 8 on the 10 point scale were played and archived to a separate file. Generation of music composed by the subject machine was achieved by the scheme shown in FIG. 11. Outputs from the IE deemed acceptable by the AAC are serially transmitted as a series of sound commands involving both frequency and duration of successive notes to the computer. These total commands are translated from digital to analog signals and fed to a loud speaker where the sounds can be heard. Therefore as the subject machine generates acceptable note sequences, it instantaneously relays them to an audio output device so that the operator of the machine can hear the music that has been produced. The next 4 notes generated by the IE were similarly added to the buffer and played, and so on. Ten samples of these melodies captured by the AAC are displayed in FIG. 12. Their frequencies F are shown in Hz (1 octave being shown), while the duration D of each note is given in units of $\frac{1}{18}$ of a second. The combination of frequency and duration produce sound.

Figure 13:
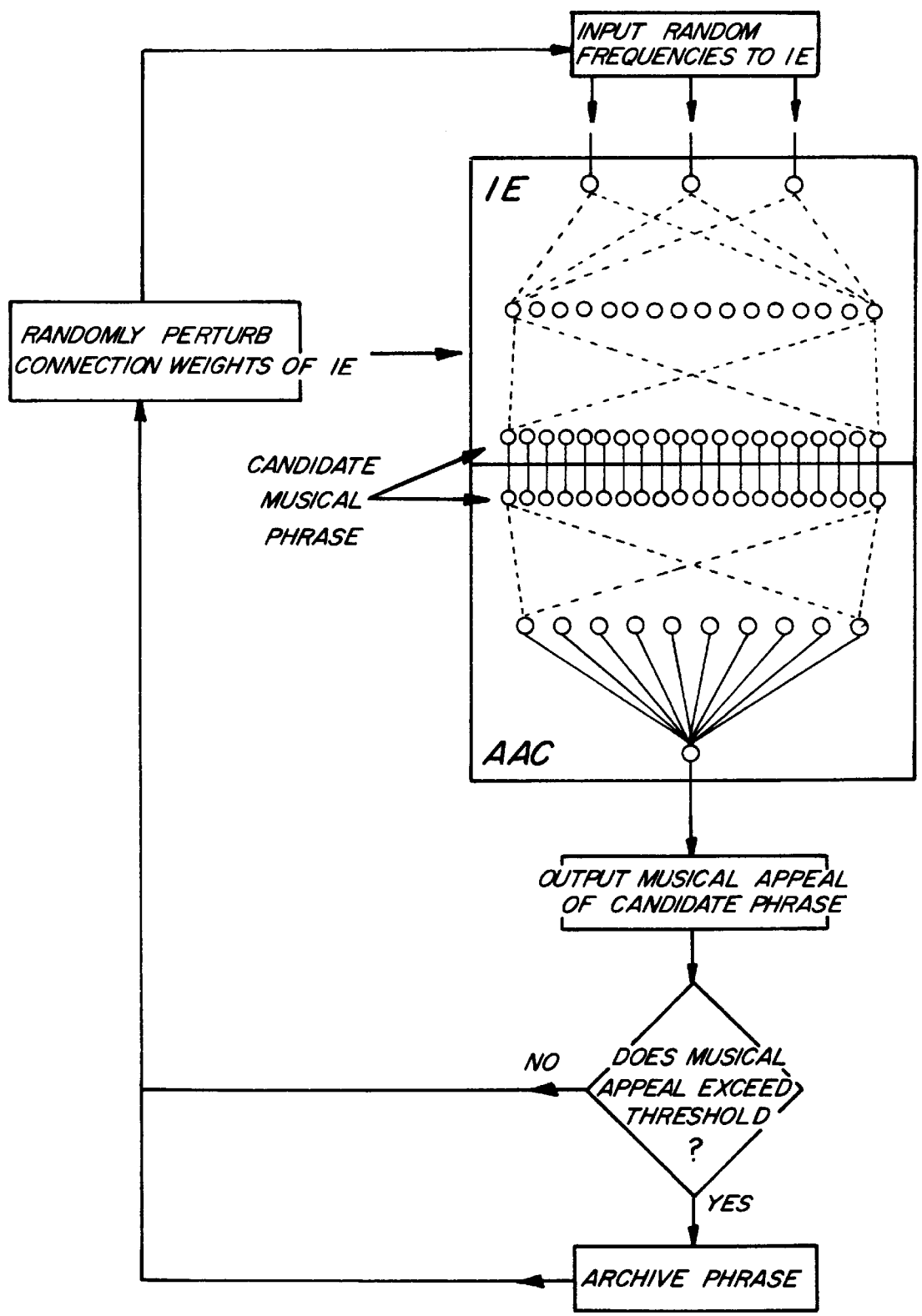
FIG. 13 shows an embodiment of the inputs and outputs of the subject device used for producing musical phrases utilizing a simple feed forward network and perturbations applied to both inputs and connection weights of that network.

A second approach to synthesizing original music involves using the subject device modified to consist of an IE of 3-16-20 nodal architecture and an AAC of 20-10-1 nodal architecture. The former produced a note sequence consisting of musical phrases or themes. Subsequently, the AAC checks this trial melodic phrase for its musical acceptability. This is shown in FIG. 13. In this case the IE is trained to perform pattern completion on the tonal frequencies (i.e., in Hz) of the first three notes within a given musical phrase. The musical phrases for training consist of very recognizable segments from twenty well known songs. Thus given the first three notes, the network was trained to supply the remainder of that musical sequence. The output consisted of ten successive frequency-duration pairs with the frequency given in Hertz and the duration in units of $\frac{1}{18}$ second.

In the same device the AAC is trained by exposure to twenty ten note segments from popular melodic themes, 50 examples of tones generated from frequencies selected from a random number table and about 100 trial melodies generated by the introduction of noise into a similar IE trained only on noise and the above popular melodic themes. Target values for training consisted of numerical scores of 1 for the popular themes, numerical rankings of 0–1 on the IE generated melodies (as determined by human panelists,) and numerical scores of 0 for noise generated using a random number table.

Figures 14A, 14B:
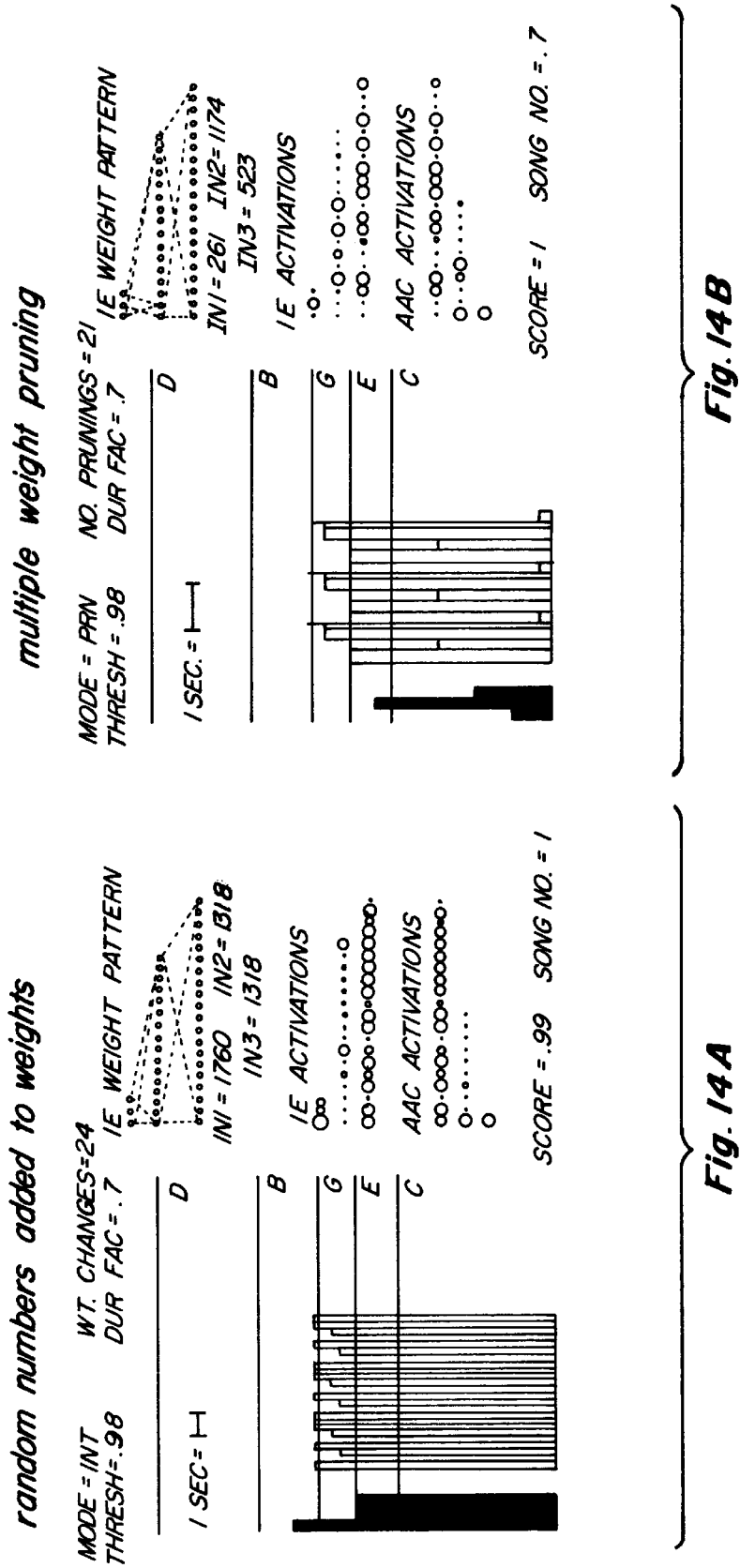
FIGS. 14A and 14B show musical phrases of acceptable form produced using a non-recurrent feed forward network.

Using various combinations of IE prunings introduction of both time-varying inputs, and time-varying perturbations to the internal connection weights of the IE enabled the subject creativity machine to run autonomously until 11,000 musically acceptable themes or phrases had been collected. Typical musical phrases created by this process are shown in FIGS. 14A and 14B. In FIG. 15 fifty representative musical phrases produced by the subject device are shown. At the top of the listing are identifiers as to the frequency and duration for the numbers shown in each row. In other words, FIG. 15 shows a number of musical themes audibly reproducible wherein the frequency and duration of each tone is indicated.

AUTOMOBILE DESIGN

Figure 16:
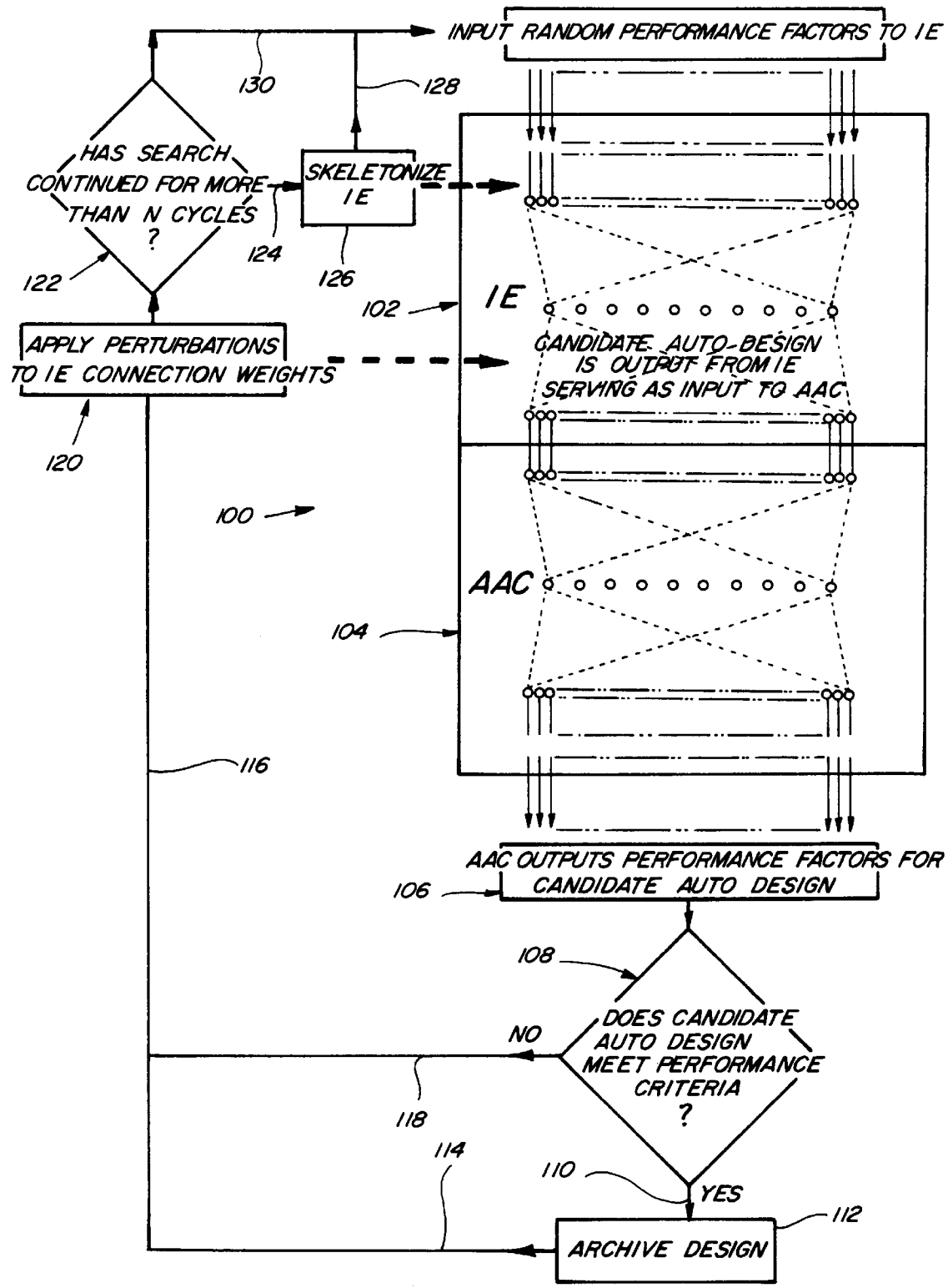
FIG. 16 illustrates the inputs and outputs produced by the subject device when used for producing novel automobile designs.

Another application of the subject device demonstrates mode A and B wherein the AAC is allowed to make autonomous decisions to modify the architecture of the IE as well as to hold certain inputs to the IE constant. The intent of this example is to design an automobile or car in terms of its major specifications and characteristics. This is done based on some notions as to its desired performance, insurance coverage, warranties, probability of theft, and anticipated user satisfaction. In creating the subject device 29 performance characteristic of the design specification are shown as possible inputs to the IE in FIG. 16. The AAC on the other hand reverse maps from the design specifications to performance characteristic. Both networks IE, and AAC, utilize a 29-10-29 nodal architecture. The structure 100 shown in FIG. 16 includes an IE 102, an AAC 104, an output 106 from the AAC which flows into a decision block 108 that bears the legend Does Candidate Auto Design Meet Performance Criteria? The block 108 has a YES output 110 which flows to an archive design block 112 which in turn flows back to the input of the device 100 through branch 116. The output of the block 108 also flows back to the input of the device 100 via branches 118 and 116. The branch 116 flows to the input of the IE 102 by a block 120 labeled Apply Perturbations to IE connection weight which provides the perturbations to IE 102. The block 120 also flows to another block 122 labeled "Search Continued For More Than N Cycles?" which has an output 124 that flows to block 126 labeled Skeletonize IE which are applied as inputs to the IE 102 and also has an output which flows to the input block labeled Input Random Performance Factors to IE. The block 124 has another output which flows through branch 130 to the same Input Random Performance Factor block to inputs of the IE 102.

In operation, the IE inputs are fed values from a random number table. As each of these 29 component vectors are propagated through the network, physically realizable automobile designs appear at its outputs, prescribed in terms of its 29 design specifications. Each set of outputs from the IE is then fed to the AAC 104 inputs wherein feed forward propagation produces the performance characteristics which would result from that particular set of specifications. These performance characteristics are then compared with those desired to determine whether or not the appropriate design has been obtained. This is what is trained into the AAC. If the design characteristics meet the criteria, the car design is displayed on some means such as a cathode ray tube. If the design does not meet these requirements, additional random inputs are fed to the IE 102 and new perturbations are applied to the IE connection weights to generate another candidate design to be evaluated in like fashion by the AAC 104. FIG. 17A shows the design of a car possessing a highway mileage of at least 30 MPG, a retail price of at most $25,000 and a projected user satisfaction of one on a (1), 0, (−1) rating scale that has been synthesized by the subject device.

It is important to note that the network in this case is producing only physically realizable car designs by carrying out vector completion on the input vector consisting of random components as well as internal perturbations applied to the IE. Also, in this example, properties such as curb weights and tire size are realistically scaled with factors such as horsepower. Thus myriad nonsensical specifications are eliminated within the IE via the soft constraints offered by the connection strengths within the trained neural network. Of the subject device is given numerous performance criteria search time will be extended. Therefore, if after a predetermined number of forward propagations such as ten propagations through the IE 102, the performance criteria have not been met, the algorithm would direct the controlled pruning of weights from the IE 102 in an attempt to narrow the search down. In this case, weights are removed one by one from the IE, while propagating a number of randomized input vectors through the entire device 100 to see if the AAC output falls within a predetermined envelope of performance values that blanket the desired range. Should a weight be removed which generates AAC outputs outside this range, it is replaced. Should a more radical automobile design be required, systematic increase of the amplitude of the perturbations applied to the connection weights of the IE would be made, depending upon the AAC to predict the performance of such hypothetical automobiles.

It will be obvious to those skilled in the art that the present invention can be used for many purposes other than the limited purposes described herein. The important thing is to recognize that by using two neural networks or groups of neural networks one of which operates as the IE and the other as the AAC that it is possible to envision myriad possible uses therefor. These uses can be in designing, problem solving, selecting, developing manufacturing processes and many other areas.

Thus there has been shown and described a novel device which simulates creativity and autonomously generates useful information for some purpose. Many changes, modifications, variations and other uses in applications for the subject device will suggest themselves, to those familiar with the art. All such changes, modifications, variations and other uses in applications which do not depart from the spirit and scope of the invention are deemed to be covered by the invention which is limited only by the claims which follow.

What is claimed is:

1. A computer-based system for developing and storing a data set representative of an emergent thought-like concept in a simulation of consciousness over a period of time, comprising:

a first simulated artificial neural network having a particular knowledge domain established therein as a result of prior training of the neural network in accordance with predefined constraints;

means for repetitively perturbing the first simulated artificial neural network to repetitively degrade the operation thereof and to thereby effect ongoing production thereby of outputs therefrom in a process tantamount to stream of consciousness associated with the particular knowledge domain of the first simulated artificial neural network;

a second simulated artificial neural network attentive to the outputs of the first artificial neural network as they are produced in response to the perturbations of the first artificial neural network in a process tantamount to awareness of stream of consciousness, said second simulated artificial neural network having an established knowledge domain and operating in accordance therewith to regulate said means for repetitively perturbing the first neural network and the ongoing perturbations in the first simulated artificial neural network, and an archive to retain at least a subset of the set of ongoing outputs from the first simulated artificial neural network over a period of time the retained subset of ongoing outputs from the first simulated artificial neural network defining a data set developed over such period of time and being tantamount to an emergent thought-like concept developed over such period of time.

2. An artificial neural network system for developing non-standard design concepts within a predefined field of endeavor, comprising a first artificial neural network portion, said first artificial neural network having been previously trained in a predefined field of endeavor and having an input portion, an output portion, and a particular knowledge domain as established therein for the predefined field of endeavor through prior training of said first neural network portion, which first trained neural network portion would be normally operable in accordance with its basic design constraints and the established knowledge domain to produce established outputs reflective of standard design concepts in the predefined field of endeavor in response to a pattern of inputs supplied to said first neural network portion at the input portion thereof, means for perturbing said first neural network portion to degrade the previously trained operation thereof, which neural network perturbation effects a change in the operation of said first neural network portion, subject to design constraints that remain in effect, to thereby effect production at the output portion of said first neural network portion, for a given pattern of inputs to said first neural network portion, of data outputs that are distinct from the corresponding standard data outputs that would be produced in response to such given pattern of inputs by said first neural network portion in the absence of such network perturbation, which distinct data outputs remain subject to the unchanged design constraints of said first neural network portion but identify distinct non-standard design concepts in the predefined field of endeavor, and a monitor portion associated with said first neural network portion to observe said data outputs therefrom and to select from among such observed data outputs certain data outputs which meet given criteria of acceptability as useful and creative non-standard design concepts within the predefined field of endeavor.

3. The artificial neural network system of claim 2, wherein the first artificial neural network portion is progressively degraded as it is perturbed.

4. The artificial neural network system of claim 2, wherein the means for perturbing the first artificial neural network portion includes means for repetitively perturbing the first artificial neural network such that the operation thereof is repetitively degraded.

5. The artificial neural network system of claim 2, wherein said monitor portion includes a second artificial neural network portion having an input portion, an output portion, and a knowledge domain established therein, and wherein at least some of the outputs of the first artificial neural network portion are provided as inputs to the second artificial neural network portion.

6. The artificial neural network system of claim 5, wherein the outputs produced by the first artificial neural network portion as it is perturbed include output information representative of a design for an object type and wherein the second artificial neural network portion maps said output information representative of a design to characteristics of the design.

7. The artificial neural network system of claim 6, wherein the object type is a material, the design is a representation of the material, and the characteristics mapped are properties of the material.

8. The artificial neural network system of claim 5, wherein the outputs produced by the first artificial neural network portion as it is perturbed include output information representative of a set of specifications of a device and wherein the second artificial neural network portion maps said output information representative of a set of specifications of a device to characteristics for given specifications.

9. The artificial neural network system of claim 5, wherein the second artificial neural network portion produces at least one output, the system further comprising means for monitoring at least one output of the second artificial neural network, and means for adjusting the perturbation of the first artificial neural network in response to the monitored output of the second artificial neural network.

10. The artificial neural network system of claim 5, wherein the second artificial neural network portion produces at least one output, the system further comprising operating means responsive to at least one of the outputs from one of the artificial neural network portions.

11. The artificial neural network system of claim 2, wherein the outputs produced by the first artificial neural network as it is perturbed include output information representative of sensory information.

12. The artificial neural network system of claim 2, wherein the first artificial neural network is a recurrent neural network.

13. The artificial neural network system of claim 2, wherein the knowledge domain established in the first artificial neural network portion includes information representative of variations in a solution to a problem.

14. The artificial neural network system of claim 2, wherein the knowledge domain established in the first neural network portion includes information representative of steps of a process.

15. The artificial neural network system of claim 14, wherein, as the first artificial neural network is perturbed the outputs therefrom represent possible novel steps in the process.

16. The artificial neural network system of claim 2, wherein the first artificial neural network portion includes a plurality of stages each capable of being operated independently of the others.

17. The artificial neural network system of claim 2, wherein the first artificial neural network portion includes a plurality of weights, biases, and activation levels associated therewith, and the means for perturbing the first artificial neural network portion includes means for altering at least one of the weights, biases, or activation levels thereof.

18. A method for deriving non-standard design concepts for a given field of endeavor from a previously trained artificial neural network that is normally operable to produce only established outputs reflective of known design concepts in response to a pattern of inputs, comprising the steps of:

(a) providing a first artificial neural network, said first artificial neural network having been previously trained in a predefined field of endeavor and having an input portion, an output portion, and a particular established knowledge domain for the predefined field of endeavor, which first previously trained neural network is normally operable in accordance with its basic design constraints and its established knowledge domain to produce at its output portion established outputs reflective of standard design concepts in response to patterns of inputs supplied to the neural network at the input portion thereof, (b) perturbing the first previously trained neural network to degrade the previously trained operation thereof to thereby effect a change in the operation of the neural network, subject to design constraints of the first previously trained neural network that remain in effect, to effect production, for a given pattern of inputs supplied to the first neural network, of data outputs that are distinct from the corresponding data outputs that would be produced by said first neural network in the absence of such network perturbation, which distinct data outputs remain subject to the unchanged design constraints of the first neural network but identify distinct non-standard design concepts in the predefined field of endeavor, (c) monitoring the first neural network to detect the data outputs produced thereby in response to perturbations, and (d) selecting from among the data outputs certain data outputs which meet given criteria of acceptability as useful and creative non-standard design concepts within the predefined field of endeavor.

19. The method of claim 18 wherein said output portion of said first neural network includes a plurality of output node activations and step (c) includes:

(i) establishing a second artificial neural network having a knowledge domain including predetermined criteria of acceptability; and (ii) providing at least one output node activation from the first artificial neural network as an input to the second artificial neural network.

20. The method of claim 18 wherein said output portion of said first neural network includes a plurality of output node activations and at least some of the data outputs produced in step (b) represent a design for a predetermined object type and wherein step (c) includes:

(i) establishing a second artificial neural network having a knowledge domain including characteristics of the predetermined object type; and (ii) providing at least one output node activation from the first artificial neural network to the second artificial neural network.

21. The method of claim 18 wherein step (b) includes:

(i) degrading the knowledge domain contained in the first artificial neural network.

22. The method of claim 21 wherein in step (b)(i) the knowledge domain of the first artificial neural network is progressively degraded.

23. The method of claim 18 wherein step (b) includes:

(i) repetitively perturbing the first artificial neural network such that the knowledge domain thereof is repetitively degraded.

* * * * *

UNITED STATES PATENT AND TRADEMARK OFFICE
CERTIFICATE OF CORRECTION

PATENT NO. : 6,018,727
DATED : January 25, 2000
INVENTOR(S) : Stephen L. Thaler

It is certified that error appears in the above-indentified patent and that said Letters Patent is hereby corrected as shown below:

Column 12, line 18, "period of time" should be --period of time,--.

Signed and Sealed this

Sixth Day of March, 2001

Attest:

NICHOLAS P. GODICI

Attesting Officer

Acting Director of the United States Patent and Trademark Office